3,108,137
PRODUCTION OF ORGANIC SULFONYL CHLORIDES

Daniel M. Barton, White Pine, and John P. Haggerty, Morristown, Tenn., assignors to Chemetron Corporation, Chicago, Ill., a corporation of Delaware
No Drawing. Filed Aug. 31, 1959, Ser. No. 836,936
10 Claims. (Cl. 260—543)

This invention relates to an improved method of producing organic sulfonic acid chlorides and particularly in the preparation of products having the following general formula $$R—SO_2—Cl$$

wherein R represents an aromatic organic radical such as phenyl, tolyl, chlorophenyl and acetamidophenyl. More specifically, this invention is directed to an improved method of producing acetylsulfanilyl chloride.

Acetylsulfanilyl chloride and related organic sulfonic acid chlorides are used in large quantity in the production of sulfa drugs and related medicinal products. In the ordinary method of producing such compounds, acetanilide, chlorobenzene or other aromatic compound is treated with an excess of chlorosulfonic acid to produce acetylsulfanilyl chloride, p-chlorobenzenesulfonyl chloride or related aromatic sulfonyl chloride in solution in the excess of chlorosulfonic acid. The reaction mixture is ordinarily quenched by being poured into cold water or on ice, whereupon the organic sulfonic acid chloride, which is insoluble in the aqueous solution, separates and may be removed, as by filtration if a solid. The filter cake of solid sulfonyl chloride so obtained contains a relatively large quantity of water. This water reacts with the acid chloride and causes considerable decomposition of the product. Methods for removing the organic sulfonyl chlorides from the water quench and drying them have been developed, such as the procedure disclosed in the Hultquist Patent No. 2,383,128 wherein acetylsulfanilyl chloride is separated from the quench water by addition of a water-immiscible inert organic liquid, such as toluene, which forms with the acetylsulfanilyl chloride a solid product which contains very little water. Most of the water is mechanically removed from the acetylsulfanilyl chloride and the product then can be dried rapidly with substantially complete removal of the water from the acetylsulfanilyl chloride. The more common practice in the production of acetylsulfanilyl chloride is to add the sulfonating solution, in chlorosulfonic acid, to cold water or to water containing ice, thereby precipitating the acetylsulfanilyl chloride which is removed by centrifugation, redissolved in a suitable organic solvent, such as benzene or toluene, and recrystallized from the concentrated solution.

The methods of the prior art leave considerable room for improvement. For instance, the organic sulfonyl chlorides which are solids are often difficult to dissolve in an organic solvent when coarse crystals are formed. Furthermore, all of the organic sulfonyl chlorides are hydrolyzed to a significant extent by reaction with water to form sulfonic acids and this reaction is accelerated at higher temperature. Consequently, on drying of the organic sulfonyl chlorides by the procedures of the prior art there is substantial reaction with water and significant decomposition of the product, thereby reducing the yields and increasing impurities. When organic sulfonyl chlorides, such as acetyl sulfanilyl chloride, are used in the production of sulfa drugs by reaction with expensive heterocyclic amines, it is important that they be of high purity in order to produce high yields of sulfa drugs of acceptable purity.

It is an object of this invention to provide an improved method of producing organic sulfonyl chlorides and particularly of producing acetylsulfanilyl chloride. Another object of this invention is to provide an improved method of recovery of organic sulfonyl chlorides from water quench procedures. A further object is to provide a method of recovering and drying organic sulfonyl chlorides from water quench procedures to provide high yields of the desired organic sulfonyl chloride. Another object of this invention is to provide a method of recovering of organic sulfonyl chlorides at low temperature in inert solvents whereby the hydrolysis of the acid chloride is reduced to a minimum. A further object is to provide a method of purifying organic sulfonyl chlorides whereby the separation of sulfonyl chlorides from sulfonic acids is increased in efficiency. These and other objects will be apparent from and are achieved in accordance with the following disclosure.

Broadly the present invention comprises the addition of the sulfonation solution, in chlorosulfonic acid, to a well agitated mixture of cold water and cold inert solvent. However, the solution of the sulfonyl chloride in chlorosulfonic acid can be mixed or dissolved in the inert solvent prior to adding to the cold water. The former procedure has been found best for normal operation. The latter procedure is found most efficient where the relatively inert solvent has only a short contact time with the sulfonation solution. The reaction mixture is treated with cold water to decompose the chlorosulfonic acid and the organic phase of organic sulfonyl chloride in the inert solvent is separated from the water phase and concentrated to cause the separation of the purified organic sulfonyl chloride. The water which is used to decompose the excess of chlorosulfonic acid may be introduced concurrently with the inert organic solvent or the reaction mixture diluted with inert organic solvent may be treated with water in a subsequent step. The resulting solution of organic sulfonyl chloride in the inert organic solvent may be washed with water to remove water-soluble materials and then evaporated, preferably at low temperature, to cause separation of the desired organic sulfonyl chloride. In cases where the organic sulfonyl chloride is a solid at ordinary temperatures, such as acetylsulfanilyl chloride, the product separates in purified crystalline form and may be separated by filtration or centrifugation.

The organic solvent which is used in this invention is a water-immiscible solvent having a boiling point (at atmospheric pressure) not greater than about 110° C. in which water is substantially insoluble. Suitable solvents are methylene dichloride, ethylene dichloride, carbon tetrachloride, chloroform, hexane and similar inert solvents in which water is soluble to an extent of less than 0.3% by weight. Other solvents that can be used but are less efficient are diethyl ether, diisopropyl ether, dimethyl ether primarily because these ethers absorb a higher concentration of water. In any case, the inert liquids used are those in which water is soluble to an extent of not more than about 2% by weight. The separation procedure is preferably carried out at temperatures in the range of −10° C. to 50° C. and particularly at temperatures in the range of 20° C. to 40° C. In such temperature ranges the reaction of the organic sulfonyl chlorides with water is very slow and very little of the organic sulfonyl chloride is lost in this way. It is desirable that the concentration of the organic solvent containing the organic sulfonyl chloride be conducted at temperatures not greater than 50° C. Low boiling solvents, such as methylene dichloride, are particularly advantageous for this purpose although higher boiling solvents, such as benzene, may be used by conducting the concentration or evaporation procedure under reduced pressure so that the temperature of the solution will not exceed 50° C. Generally aromatic solvents, such as benzene, are not desirable since there may be side reactions with the organic sulfonyl chlorides resulting in the formation of sulfones. As these reactions can take place at temperatures above 50° C., the temperature can be carefully maintained below 50° C. and aromatic solvents may be used with a minimum of sulfone formation. Halogenated aliphatic hydrocarbons are particularly desirable for the purposes of this invention since they are relatively inert to the sulfone formation.

The present invention has substantial advantages over the methods of the prior art. First, it permits the operation of a continuous quench procedure instead of batch techniques which were required by the prior art. Second, it gives increased yields of organic sulfonyl chlorides. Third, it reduces the exposure of the organic sulfonyl chlorides to direct contact with water, thereby minimizing hydrolysis of the organic sulfonyl chloride and improving the quality of the product. Fourth, it reduces the labor requirement substantially from that required by prior art procedures.

The procedure found most suitable for practical operation is to add the sulfonation solution of the organic sulfonyl chloride in chlorosulfonic acid to a homogeneously agitated mixture of water and the water-immiscible solvent. After quenching, the agitation is stopped and the organic layer which separates is removed, washed with water to remove water-soluble materials and evaporated. In some cases it may be preferable to dry the organic solution prior to evaporation if the solvent is one which dissolves more than 1% water by weight. This procedure is considered more efficient since there are few if any solvents that are completely inert towards chlorosulfonic acid. An alternative procedure is to dilute the sulfonation solution of the organic sulfonyl chloride in chlorosulfonic acid with the water-immiscible solvent and then quench this solution with water under good agitation.

In the solvent quench procedure of this invention, low boiling solvent gives better yields and purer grade of product when these solvents are removed by distillation. A prime requisite is that sufficient solvent be available to dissolve the organic sulfonyl chloride as it breaks from the sulfonation solution in chlorosulfonic acid as it comes in contact with the quench water. The solvent is immiscible in the aqueous acid phase and should have the property of removing water by azeotropic distillation when evaporated. This removal of water protects the organic sulfonyl chloride from hydrolysis. While the preferred solvents are chlorinated hydrocarbons, such as methylene dichloride and ethylene dichloride, aromatic hydrocarbons, such as benzene and toluene, are useful in the production of chlorobenzenesulfonyl chloride. It is desirable to use an organic solvent in which the organic sulfonic acid which results from the hydrolysis of the organic sulfonyl chloride is relatively insoluble, thereby providing a means for purifying the desired organic sulfonyl chloride. For instance, hexane is a particularly useful solvent in the isolation of p-chlorobenzenesulfonyl chloride because it is a poor solvent for p-chlorobenzenesulfonic acid. On the other hand, methylene dichloride and benzene are relatively better solvents for p-chlorobenzenesulfonic acid, and, therefore, do not serve to purify the p-chlorobenzensulfonyl chloride in the separation procedure.

The invention is disclosed in further detail by means of the following examples which are provided for purposes of illustration only and are not to be interpreted as limiting the scope of the invention. It will be appreciated by those skilled in the art that numerous modifications in concentrations, temperatures, times, equivalent materials and the like may be made within the scope of this disclosure without departing from the invention.

*Example 1*

135 parts of acetanilide were added to 583 parts of chlorosulfonic acid, cooled to 25–40° C., with agitation. The solution was warmed to 60° C. for two hours with agitation and then cooled to about 25° C. 1200 parts of water and 4,000 parts of methylene dichloride were mixed and cooled to 5° C., then agitated to form a homogeneous mixture. The sulfonation solution was added to the cooled agitated mixture of water and methylene dichloride at such a rate that the mixture did not exceed a pot temperature of 50° C. After the sulfonation mixture had been added, agitation was stopped and the phases allowed to separate. The lower methylene dichloride phase containing the acetylsulfanilyl chloride was removed and washed twice with 100 parts of water at 35° C. to 39° C. The methylene dichloride phase was then removed and concentrated by distillation to about 14% of its original volume. During the concentration, acetylsulfanilyl chloride separated. The mixture was cooled to 10° C. and filtered. The filter cake of acetylsulfanilyl chloride was washed with two portions of 135 parts of dry methylene dichloride at 10° C. In this way 152.8 parts of purified acetylsulfanilyl chloride were obtained (63.2% yield), while the methylene dichloride mother liquor and wash contained 32 parts of additional acetylsulfanilyl chloride.

*Example 1A*

A second run was conducted exactly as in Example 1 wherein the methylene dichloride mother liquor from Example 1 was added as part of the methylene dichloride solvent. In this run a yield of 185.2 parts of acetylsulfanilyl chloride (78.5%) was recovered. This product assayed as 98% pure by chlorine analysis and had a U.S.P. melting point of 146–149° C.

*Example 2*

The procedure of Example 1 was followed except that 8,000 parts of methylene dichloride were used and the maximum temperature permitted in the quench operation was 15° C. rather than 60° C. as in Example 1. There was obtained 181.4 parts (77.5%) of acetylsulfanilyl chloride melting at 144–149° C.

*Example 3*

The procedure of Example 1 was followed with the following variations: The sulfonation solution was added to 5,350 parts of methylene dichloride and to the resulting solution was added 200 parts of water with agitation, the temperature being maintained at 27–34° C. over a period of about a half hour. 1,000 parts of water were then added rapidly, the maximum temperature of the mixture reaching 39° C. The methylene dichloride phase was removed and the acetylsulfanilyl chloride was isolated as in Example 1. There was thus obtained 184.4 parts of acetylsulfanilyl chloride (78.8%) of melting point 145–149° C.

*Example 4*

The procedure of Example 3 was followed except that the total amount of water added was 440 parts and the amount of methylene dichloride solvent used was 2700 parts. The acetylsulfanilyl chloride was isolated as described in Example 1 and there was obtained 173 parts of acetylsulfanilyl chloride (74%) yield.

*Example 5*

337.5 parts of monochlorobenzene were added to 1430 parts of chlorosulfonic acid with good agitation, the temperature being maintained below 38° C. After the addition of the chlorobenzene the reactants were maintained at 50° C. for one hour. 3600 parts or normal hexane and 2400 parts of water were cooled to 5° C. and agitated vigorously to form a homogeneous mixture. The sulfanation solution was added to the hexane-water mixture at a rate such that the temperature of the pot did not exceed 50° C. Agitation was stopped and the phases permitted to separate. The upper hexane layer was washed twice with 100 parts of water and then evaporated by distillation to about 15% of its original volume. The precipitate of p-chlorobenzenesulfonyl chloride was separated by filtration. A yield of 448 parts (71%) was recovered.

What is claimed as new and is desired to be secured by Letters Patent of the United States is:

1. The method of producing a member of the group consisting of acetylsulfanilyl chloride and p-chlorobenzenesulfonyl chloride which consists of (a) reacting a member of the group consisting of acetanilide and monochlorobenzene, respectively, with an excess of chlorosulfonic acid at a temperature not exceeding about 60° C. to produce an aromatic sulfonyl chloride in the excess of chlorosulfonic acid, (b) quenching the chlorosulfonation reaction mixture in an agitated mixture of water and an inert water-immiscible organic solvent having a boiling point not greater than about 110° C. and in which water is soluble to an extent not greater than about 2% by weight, while maintaining the temperature of said quenching at a value not exceeding 50° C., thereby forming a solution of the aromatic sulfonyl chloride in the water-immiscible organic solvent, (c) separating said solution of the aromatic sulfonyl chloride in the water-immiscible organic solvent from the aqueous phase and (d) isolating the aromatic sulfonyl chloride from said solvent.

2. The method of claim 1 wherein the temperature of the mixture during quenching is not substantially greater than 50° C.

3. The method of claim 1 wherein the water-immiscible organic solvent is a halogenated hydrocarbon.

4. The method of claim 1 wherein the water-immiscible organic solvent is a hydrocarbon.

5. A method of recovering acetylsulfanilyl chloride produced by chlorosulfonation of acetanilide with an excess of chlorosulfonic acid, which comprises quenching the chlorosulfonation mixture consisting of acetylsulfanilyl chloride and chlorosulfonic with an agitated mixture of water and an inert water-immiscible organic solvent having a boiling point not greater than 110° C., maintaining the temperature of the reaction between the sulfonation mixture and the mixture of water and inert organic solvent at not substantially greater than 50° C., separating the solution of acetylsulfanilyl chloride in the immiscible organic solvent and separating the acetylsulfanilyl chloride from the organic solvent.

6. The method of claim 5 wherein the water-immiscible organic solvent is a halogenated hydrocarbon.

7. The method of claim 6 wherein the water-immiscible organic solvent is methylene dichloride.

8. The method of recovering chlorobenzenesulfonyl chloride produced by chlorosulfonation of chlorobenzene with an excess of chlorosulfonic acid, which comprises quenching the chlorosulfonation mixture consisting of chlorobenzenesulfonyl chloride in chlorosulfonic acid in an agitated mixture of water and an inert water-immiscible organic solvent having a boiling point not substantially greater than 110° C., while maintaining the temperature of the quench reaction at a value not substantially greater than 50° C., separating the solution of chlorobenzenesulfonyl chloride in the organic solvent from the aqueous solution and isolating the chlorobenzenesulfonyl chloride from the organic solvent.

9. The method of claim 8 wherein the inert water-immiscible organic solvent is an aliphatic hydrocarbon having a boiling point less than 110° C.

10. The method of claim 9 wherein the water-immiscible inert organic solvent is hexane.

References Cited in the file of this patent

UNITED STATES PATENTS

| | | |
|---|---|---|
| 2,383,128 | Hultquist | Aug. 21, 1945 |
| 2,866,821 | Wargotz et al. | Dec. 30, 1958 |
| 2,996,541 | Beinfest et al. | Aug. 15, 1961 |

FOREIGN PATENTS

| | | |
|---|---|---|
| 495,433 | Belgium | Aug. 16, 1950 |
| 339,199 | Switzerland | Aug. 15, 1959 |

OTHER REFERENCES

Huntress et al.: J.A.C.S., vol. 62, pages 511–513 (1940).

Newton: J.A.C.S., vol. 65, pages 2439–41 (1943). (Copies in library.)